(12) United States Patent
Salter et al.

(10) Patent No.: US 11,607,987 B1
(45) Date of Patent: Mar. 21, 2023

(54) MULTI-FUNCTIONAL HEADLAMP AND IMAGE PROJECTOR

(71) Applicant: Ford Global Technologies, LLC, Dearborn, MI (US)

(72) Inventors: Stuart C. Salter, White Lake, MI (US); Aaron B. Johnson, Allen Park, MI (US); Luciano Lukacs, Plymouth, MI (US); Paul Kenneth Dellock, Northville, MI (US); David Brian Glickman, Southfield, MI (US); William Wurz, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/684,882

(22) Filed: Mar. 2, 2022

(51) Int. Cl.
*B60Q 1/00* (2006.01)
*F21S 41/16* (2018.01)

(52) U.S. Cl.
CPC ............ *B60Q 1/0023* (2013.01); *F21S 41/16* (2018.01)

(58) Field of Classification Search
CPC .............................. B60Q 1/0023; F21S 41/16
See application file for complete search history.

(56) References Cited

U.S. PATENT DOCUMENTS

| | | | |
|---|---|---|---|
| 10,134,280 B1 | 11/2018 | You | |
| 10,293,745 B2 | 5/2019 | Vargas Rivero et al. | |
| 10,300,846 B2 | 5/2019 | Suzuki et al. | |
| 10,558,866 B2 | 2/2020 | Potter et al. | |
| 10,611,296 B2 * | 4/2020 | Kunii | G03B 29/00 |
| 10,738,955 B2 * | 8/2020 | Mouri | F21S 41/176 |
| 2020/0150650 A1 | 5/2020 | Jarlengrip | |
| 2020/0269749 A1 * | 8/2020 | Shoda | G08G 1/149 |

* cited by examiner

*Primary Examiner* — Jason M Han
(74) *Attorney, Agent, or Firm* — Vichit Chea; Carlson, Gaskey & Olds, P.C.

(57) ABSTRACT

A method and an apparatus, according to an exemplary aspect of the present disclosure includes, among other things, a vehicle headlamp assembly comprising at least one laser and a controller in communication with the vehicle headlamp assembly to control the at least one laser to provide a plurality of functions. An input device is configured to receive input commands to control the at least one laser to provide a selected one of the plurality of functions.

22 Claims, 1 Drawing Sheet

MULTI-FUNCTIONAL HEADLAMP AND IMAGE PROJECTOR

TECHNICAL FIELD

This disclosure relates generally to a headlamp assembly that provides multiple different functions.

BACKGROUND

The automotive industry continuously strives to provide vehicle components with additional functions and features that extend beyond their traditional functions.

SUMMARY

An apparatus according to an exemplary aspect of the present disclosure includes, among other things, a vehicle headlamp assembly comprising at least one laser and a controller in communication with the vehicle headlamp assembly to control the at least one laser to provide a plurality of functions. An input device is configured to receive input commands to control the at least one laser to provide a selected one of the plurality of functions.

In a further non-limiting embodiment of the foregoing apparatus, the plurality of functions comprise one or more of: a levelling function, a worksite survey function, an outdoor projector function, a traffic light function.

In a further non-limiting embodiment of any of the foregoing apparatus, the plurality of functions comprise a levelling function, a worksite survey function, an outdoor projector function, and a traffic light function.

In a further non-limiting embodiment of any of the foregoing apparatus, the vehicle headlamp assembly is adjustable in multiple degrees of freedom.

In a further non-limiting embodiment of any of the foregoing apparatus, the vehicle headlamp assembly is configured to be mounted within a vehicle that includes a valet park function such that a position of the vehicle headlamp assembly can be selectively adjusted by activating the valet park function to move the vehicle to a desired location.

In a further non-limiting embodiment of any of the foregoing apparatus, one or more of the following components are used to provide input data to the controller to control the valet park function: camera, sonar, radar, LiDar, GPS, GNSS, RTK beacon.

In a further non-limiting embodiment of any of the foregoing apparatus, the vehicle headlamp assembly is configured to be mounted within a vehicle, and wherein the controller is configured to receive data from a satellite-based positioning system and an RTK beacon to determine a position of the vehicle, and wherein the controller is configured to receive worksite architectural and utility data such that the at least one laser can be adjusted to identify the location of underground items, and/or such that the at least one laser can be adjusted to identify locations of specific architectural site features.

In a further non-limiting embodiment of any of the foregoing apparatus, the controller is configured to receive the worksite architectural and utility data such that the vehicle headlamp assembly can be used to project an approximate depth of the underground items.

In a further non-limiting embodiment of any of the foregoing apparatus, the input device comprises a touch screen, a mobile device, and/or a voice command module that can respond to voice commands either through interior/exterior sound exciters or the mobile device.

In a further non-limiting embodiment of any of the foregoing apparatus, an advance driver assist system monitors movement between a vehicle including the vehicle headlamp assembly and a laser line generated by the vehicle headlamp assembly, and wherein the controller deactivates the at least one laser if no movement is detected within a predetermined amount of time.

In a further non-limiting embodiment of any of the foregoing apparatus, the controller is configured to receive wireless communications from arriving/departing worksite vehicles and to control the at least one laser to provide a traffic light function to control worksite traffic patterns and identify designated parking locations.

A method according to still another exemplary aspect of the present disclosure includes, among other things: providing a vehicle headlamp assembly with at least one laser; controlling the at least one laser to provide a plurality of functions; and selectively activating an input device to communicate control commands to control the at least one laser to provide a selected one of the plurality of functions.

In a further non-limiting embodiment of the foregoing method, the plurality of functions comprise one or more of a levelling function, a worksite survey function, an outdoor projector function, a traffic light function; and the method further includes adjusting the vehicle headlamp assembly in multiple degrees of freedom to provide the plurality of functions.

In a further non-limiting embodiment of any of the foregoing methods, the vehicle headlamp assembly is configured to be mounted within a vehicle that includes a valet park function, and including selectively adjusting a position of the vehicle headlamp assembly by activating the valet park function to move the vehicle.

In a further non-limiting embodiment of any of the foregoing methods, the method further includes providing input data to the controller to control the valet park function via one or more of a camera, sonar, radar, LiDar, GPS, GNSS, RTK beacon.

In a further non-limiting embodiment of any of the foregoing methods, the vehicle headlamp assembly is configured to be mounted within a vehicle, and the method further includes receiving data from a satellite-based positioning system and an RTK beacon to determine a position of the vehicle, and receiving worksite architectural and utility data such that the at least one laser can be adjusted to identify the location of underground items, and/or such that the at least one laser can be adjusted to identify locations of specific architectural features.

In a further non-limiting embodiment of any of the foregoing methods, the method further includes receiving the worksite architectural and utility data and using the vehicle headlamp assembly to project an approximate depth of the underground items.

In a further non-limiting embodiment of any of the foregoing methods, the input device comprises a touch screen, a mobile device, and/or a voice command module that can respond to voice commands either through interior/exterior sound exciters or the mobile device.

In a further non-limiting embodiment of any of the foregoing methods, the method further includes monitoring movement between a vehicle including the vehicle headlamp assembly and a laser line generated by the vehicle headlamp assembly to provide one of the plurality of functions, wherein movement is monitored using an advance driver assist system, and including deactivating the at least one laser if no movement is detected within a predetermined amount of time.

In a further non-limiting embodiment of any of the foregoing methods, the method further includes receiving wireless communications from arriving/departing worksite vehicles and selectively controlling the at least one laser to provide a traffic light function to control worksite traffic patterns and identify designated parking locations.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary headlamp assembly that provides multiple functions to operate as both an office and a worksite tool.

Figure 1:
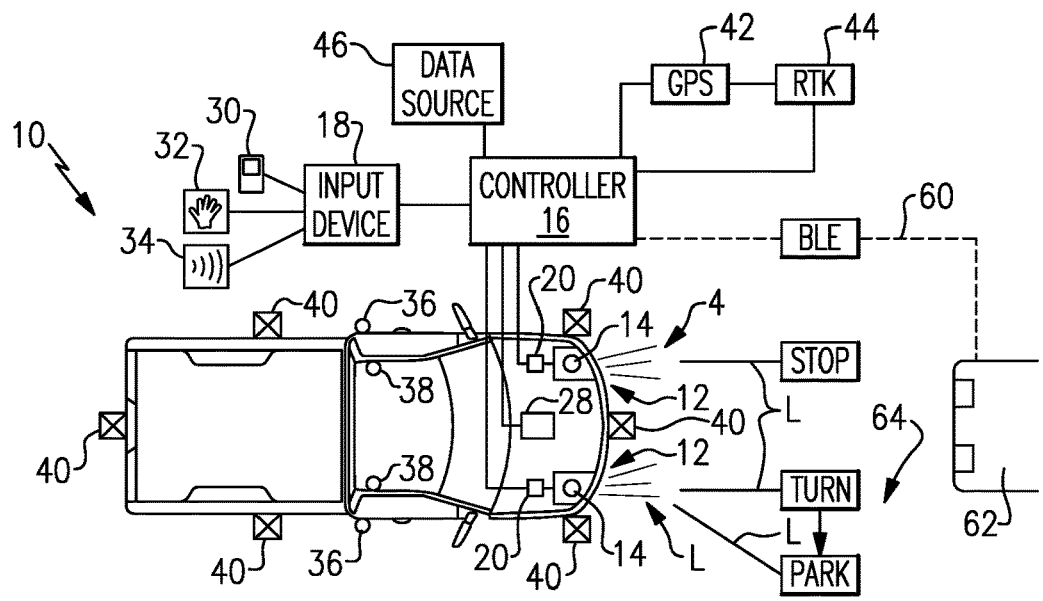
FIG. 1 is a schematic representation of a vehicle with headlamp assemblies that provide multiple functions.

FIG. 1 shows a vehicle 10 with a vehicle headlamp assembly 12 that includes at least one light that comprises a laser 14. In one example, the laser 14 is an RGB laser system with three light sources (red, green, blue) which combine to make RGB laser light projections L. A controller 16 is in communication with the vehicle headlamp assemblies 12 to control the lasers 14 to provide a plurality of functions. An input device 18 is configured to receive input commands to control the lasers 14 to provide a selected one of the plurality of functions.

In one example, the plurality of functions comprise, in any combination, one or more of: a levelling function, a worksite survey function, an outdoor projector function, a traffic light function. In another example, the plurality of functions comprise all of the following: a levelling function, a worksite survey function, an outdoor projector function, and a traffic light function.

In order to provide these functions, the vehicle headlamp assemblies 12 are adjustable in multiple degrees of freedom. In one example, an adjuster 20 is coupled to each headlamp assembly 12 to provide adjustment in multiple different directions. The adjuster 20 can provide for translational and/or rotational movement along/about the X, Y and/or Z directions.

The controller 16 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 16 may be a hardware device for executing software, particularly software stored in memory. The controller 16 can be a custom made or commercially available processor, a central processing unit (CPU), an auxiliary processor among several processors associated with the computing device, a semiconductor based microprocessor (in the form of a microchip or chip set) or generally any device for executing software instructions. The software in the memory may include one or more separate programs, each of which includes an ordered listing of executable instructions for implementing logical functions. The controller 16 can be configured to execute software stored within the memory, to communicate data to and from the memory, and to generally control operations of the computing device pursuant to the software.

Figure 2:
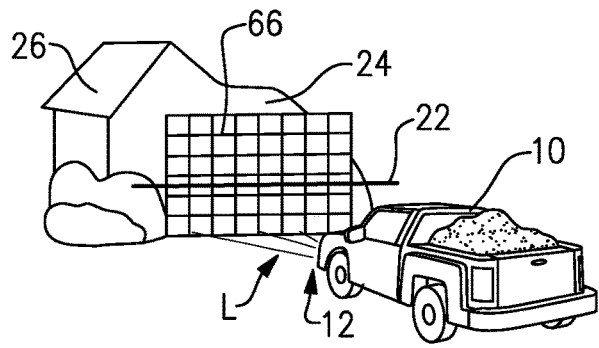
FIG. 2 shows a projection and/or leveling function.

In one example, the vehicle headlamp assemblies 12, in addition to providing traditional headlight functions, operate as a tool at a worksite. The headlamp assemblies 12 can provide a construction level function using a laser self-leveling feature as shown in FIG. 2. The headlamp assemblies 12 can project an example leveling laser line 22 on a wall 24 of a building 26 under construction, for example. The line projections are made based on input commands communicated to the input device 18.

A laser level function makes it possible for a single person to perform leveling or grading tasks that would normally require two people using traditional manual tools. For example, common uses for laser levels are leveling work sites, grading terrain, or leveling floors. This type of laser self-leveling function is very accurate. Additional features can also be programmed into the system such as being switchable between continuous self-levelling or not, identification of TILT movement, Grade/Slope setting, etc.

To project on different surfaces, the vehicle can use a valet park function 28 to move around on the worksite. The valet park function 28 comprises command communication with a driverless vehicle to move the vehicle to designated areas. The valet park function 28 allows the vehicle to be shifted into gear such that it can be driven at a slow speed to a desired location. For example, input commands can say "move two feet forward", "move three feet to the left", "move one foot backward", etc. The vehicle is configured such that when operating in the valet park mode, the vehicle is only capable of moving less than five miles per hour. Additionally, an announcement can be issued via the controller 16 and associated sound exciters that vehicle movement is about to start. Exciters work by vibrating a surface they are mounted to, which creates a high-quality invisible speaker.

The vehicle and valet park function 28 can be activated via the input device 18. The input device 18, for example, can comprise a mobile device 30, a touch screen 32, and/or a voice command 34 through exterior sound exciters 36, interior sound exciters 38, or the mobile device. Additionally, the controller 16 can adjust the position of the laser lights 14 using voice commands. For example by saying "move the line higher", the vehicle can aim the headlight laser levelling line 22 higher on the wall 24. Thus, a position of each vehicle headlamp assembly 12 can be selectively and independently adjusted by activating the valet park function and/or the respective adjuster 20. In one example, Advance Driver Assist Systems (ADAS) are used to facilitate operation of the valet park function 28. For example, one or more of the following ADAS components 40, 42, 44 can be used to provide input data to the controller 16 to control the valet park function 28: camera, sonar, radar, LiDar, Global Positioning System (GPS), Global Navigation Satellite System (GNSS), Real Time Kinematic (RTK) beacon.

Figure 3:
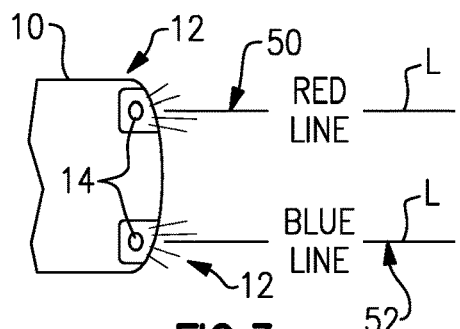
FIG. 3 shows a utility line identification function.

In one example, the controller 16 is configured to receive data from a satellite-based positioning system 42 and an RTK beacon 44 to determine a position of the vehicle 10. The controller 16 is also configured to receive worksite architectural and utility data from a data source 46 such that the lasers 14 can be adjusted to identify the location of underground items 48 such as utility lines, sewers, tanks, and drainage systems, for example. As shown in FIG. 3, these locations could be identified by red lines 50, for example, as "no dig" areas. The lasers 14 can also be adjusted to identify locations of specific architectural site features such as footing locations where digging would be permitted. These areas could be shown as "dig" areas by lighted circles or blue lines 52, for example.

Figure 4:
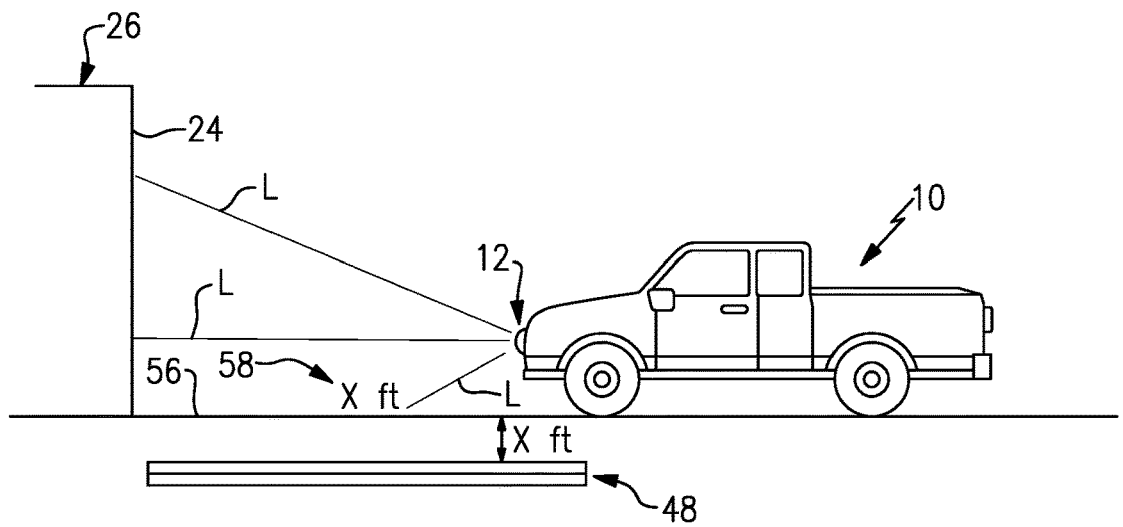
FIG. 4 shows projecting utility line depth information.

Additionally, as shown in FIG. 4, the controller 16 is configured to receive the worksite architectural and utility data such that the vehicle headlamp assemblies 12 can be used to project an approximate depth X of the underground items 48. For example, the underground item 48 could be X feet below a ground surface 56. The lasers 14 are configured to project this distance on the ground surface 56, as indicated at 58, such that it is viewable from above ground.

The projections of the lasers 14 for worksite and architectural locations are initiated by input commands to the input device 18 as described above. The valet park function 28 can be also be activated via the input device 18 to adjust the position of the projections. Additionally, the controller 16 can adjust the position of the lasers 14 via input commands communicated to the input device 18. Thus, a position of each vehicle headlamp assembly 12 can be selectively and independently adjusted by activating the valet park function and/or the respective adjuster 20 to correctly position the projections in the correct locations. The ADAS is used to facilitate operation of the valet park function 28 as described above.

The combination of the satellite-based positioning system 42 and the RTK beacon 44 allows the location of the vehicle to be accurately identified within 1 cm. This means the truck can very accurately locate itself on a worksite. At a construction site before any excavation can begin, a contractor must call a service provider to have the site marked for existing underground utility lines, sewers, tanks, and drainage systems. This process can take several days. The utility lines are then marked by a surveyor with a series of color coded flags and hand painted lines. These marked lines can be up to +/−4 ft form the actual location. Also, no depth information is given so the contractor is asked to hand dig to locate the utility lines, and then the contractor can more accurately mark the lines. This is an expensive process that adds several days to the completion time of a project.

With the RGB laser lights 14 of the subject disclosure, there is the ability to use the satellite-based positioning system 42 and the RTK beacon 44 to accurately locate vehicle position within 1 cm. Existing data can be loaded into the controller 16 from the data source 46, and then the lasers 14 can project lines/areas showing where the underground items are located. These projected lines can be accurately projected on the ground within roughly 2 inches in X, Y and Z directions. Additionally, the approximate depth of the lines can be projected on the ground. This can save days and significantly reduce the expense of an excavation job. By more accurate mapping of the location of underground items 48, a contractor can more easily find the items to work around them. They also avoid losing time while waiting for the service provider to schedule a time and come out and survey/mark the underground items.

In one example, the ADAS is also used to monitor movement between the vehicle 10 and a laser line/projection L generated by the vehicle headlamp assembly 12 for the various functions. Movement would indicate that work was being done in relation to the projections L. If movement is not detected there may be no need for continuing to display the projections L. In one example, the controller 16 deactivates the lasers 14 if no movement is detected within a predetermined amount of time.

In another example, the controller is configured to receive messages 60 from other arriving/departing worksite vehicles 62 as shown in FIG. 1. These messages 60 can be wireless communications via Bluetooth Low Energy (BLE), for example. The controller 16 can then control the lasers 14 to provide a traffic light function to control worksite traffic patterns and identify designated parking locations. Directing traffic in this manner at construction sites can provide several benefits. A BLE message 60 can be received from an arriving expected/scheduled vehicle 62, and this vehicle can then be directed to park or dump/unload in a specific location based on specific contents. Or, the controller 16 can communicate with an unidentified vehicle 62 and project lines L to direct the unidentified vehicle 62 where to park to be out of the way, as indicated at 64 in FIG. 1. Additionally, the lasers 14 could function as a traffic light (GREEN-YELLOW-RED) for traffic control, and could project an amber light to turn the vehicle into a "construction barrel" lamp for foggy conditions on the construction site.

In another example, the lasers 14 are used as a projector for worksite conferences. As shown in FIG. 2, a display 66 can be projected onto the wall 24. For example, a laptop can be plugged into a communications port, or can connect via WIFI to the vehicle 10, and the presentation on the laptop can then be projected through headlamp assembles 12. The headlamp assemblies 12 can work in tandem to make a larger screen for presentations. Additionally, by using the ADAS road view camera, a smart projector can be provided that can livestream the presentation and/or do live mark-ups based on hand motions on the screen. Also, auto focus with ADAS radar components can allow the headlamp assemblies 12 to be adjusted in the fore-aft direction to help focus the image instead of driving the vehicle back and forth to get a focused image on screen. In one example, the headlamp assemblies 12 can flash to indicate where to stop when the vehicle is within a range of headlamp projector adjustment. Also, the presentation can be given from inside the vehicle using exterior sound exciters with adjustment through a touch screen, and the projector/display can be adjusted with voice control through exterior sound exciters.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An apparatus, comprising:
a vehicle headlamp assembly comprising at least one laser;
an adjuster coupled to the vehicle headlamp assembly to provide adjustment of the at least one laser in multiple different directions;
a controller in communication with the vehicle headlamp assembly, wherein the controller controls the adjuster to provide for translational and/or rotational movement of the at least one laser along and about at least three different axes to control the at least one laser to provide a plurality of functions; and
an input device configured to receive input commands to control the at least one laser to provide a selected one of the plurality of functions.

2. The apparatus of claim 1, wherein the plurality of functions comprise one or more of: a levelling function, a worksite survey function, an outdoor projector function, a traffic light function.

3. The apparatus of claim 1, wherein the plurality of functions comprise a levelling function where a headlight laser levelling line is projected on a surface and adjusted by the adjuster to move the headlight laser levelling line to a desired level, a worksite survey function, an outdoor projector function, and a traffic light function.

4. The apparatus of claim 1, wherein the at least one laser of the vehicle headlamp assembly is adjustable in multiple degrees of freedom by the adjuster in response to input commands via a mobile device, a touch screen, and/or a voice command.

5. The apparatus of claim 1, wherein the vehicle headlamp assembly is configured to be mounted within a vehicle that includes a valet park function such that a position of the at least one laser of the vehicle headlamp assembly can be selectively adjusted via the adjuster by activating the valet park function to move the vehicle to a desired location.

6. The apparatus of claim 5, including one or more of the following components that are used to provide input data to the controller to control the valet park function: camera, sonar, radar, LiDar, GPS, GNSS, RTK beacon.

7. The apparatus of claim 1, wherein the input device comprises a touch screen, a mobile device, and/or a voice command module that can respond to voice commands either through interior/exterior sound exciters or the mobile device.

8. The apparatus of claim 1, including an advance driver assist system to monitor movement between a vehicle including the vehicle headlamp assembly and a laser line generated by the vehicle headlamp assembly, and wherein the controller deactivates the at least one laser if no movement is detected within a predetermined amount of time.

9. The apparatus of claim 1, wherein the plurality of functions comprise at least a worksite survey function, wherein the at least one laser projects lines and/or areas showing where underground items are located, and wherein the at least one laser projects a depth of the at least one underground item on a ground surface.

10. An apparatus, comprising:
a vehicle headlamp assembly comprising at least one laser, wherein the vehicle headlamp assembly is configured to be mounted within a vehicle;
a controller in communication with the vehicle headlamp assembly to control the at least one laser to provide a plurality of functions;
an input device configured to receive input commands to control the at least one laser to provide a selected one of the plurality of functions; and
wherein the controller is configured to receive data from a satellite-based positioning system and an RTK beacon to determine a position of the vehicle, and wherein the controller is configured to receive worksite architectural and utility data such that the at least one laser can be adjusted to identify the location of underground items, and/or such that the at least one laser can be adjusted to identify locations of specific architectural site features.

11. The apparatus of claim 10, wherein the controller is configured to receive the worksite architectural and utility data such that the vehicle headlamp assembly can be used to project an approximate depth of the underground items.

12. An apparatus, comprising:
a vehicle headlamp assembly comprising at least one laser;
a controller in communication with the vehicle headlamp assembly to control the at least one laser to provide a plurality of functions;
an input device configured to receive input commands to control the at least one laser to provide a selected one of the plurality of functions, —; and wherein the controller is configured to receive wireless communications from arriving/departing worksite vehicles and to control the at least one laser to provide a traffic light function to control worksite traffic patterns and identify designated parking locations.

13. A method comprising:
providing a vehicle headlamp assembly with at least one laser;
controlling the at least one laser to provide a plurality of functions by using an adjuster that is coupled to the vehicle headlamp assembly to provide adjustment of the at least one laser in multiple different directions, wherein the adjuster provides for translational and rotational movement of the at least one laser along and/or about at least three different axes; and
selectively activating an input device to communicate control commands to control the at least one laser to provide a selected one of the plurality of functions.

14. The method of claim 13, wherein the plurality of functions comprise at least a levelling function where a headlight laser levelling line is projected on a surface and adjusted by the adjuster to move the headlight laser levelling line to a desired level, and wherein the plurality of functions further comprises one or more of a worksite survey function, an outdoor projector function, a traffic light function.

15. The method of claim 13, wherein the vehicle headlamp assembly is configured to be mounted within a vehicle that includes a valet park function, and including selectively adjusting a position of the at least one laser of the vehicle headlamp assembly by activating the valet park function to move the vehicle.

16. The method of claim 15, including providing input data to the controller to control the valet park function via one or more of a camera, sonar, radar, LiDar, GPS, GNSS, RTK beacon.

17. The method of claim 13, wherein the input device comprises a touch screen, a mobile device, and/or a voice command module that can respond to voice commands either through interior/exterior sound exciters or the mobile device.

18. The method of claim 13, including monitoring movement between a vehicle including the vehicle headlamp assembly and a laser line generated by the vehicle headlamp assembly to provide one of the plurality of functions, wherein movement is monitored using an advance driver assist system, and including deactivating the at least one laser if no movement is detected within a predetermined amount of time.

19. The method of claim 13, including receiving wireless communications from arriving/departing worksite vehicles and selectively controlling the at least one laser to provide a traffic light function to control worksite traffic patterns and identify designated parking locations.

20. The method of claim 13, wherein the plurality of functions comprise at least a worksite survey function, wherein the at least one laser projects lines and/or areas showing where underground items are located, and wherein the at least one laser projects a depth of the at least one underground item on a ground surface.

21. A method comprising:
providing a vehicle headlamp assembly with at least one laser, wherein the vehicle headlamp assembly is configured to be mounted within a vehicle;
controlling the at least one laser to provide a plurality of functions;
selectively activating an input device to communicate control commands to control the at least one laser to provide a selected one of the plurality of functions; and
further including:
receiving data from a satellite-based positioning system and an RTK beacon to determine a position of the vehicle, and receiving worksite architectural and utility data such that the at least one laser can be adjusted to identify the location of underground items, and/or such that the at least one laser can be adjusted to identify locations of specific architectural features; or
receiving wireless communications from arriving/departing worksite vehicles and selectively controlling the at least one laser to provide a traffic light function to control worksite traffic patterns and identify designated parking locations.

22. The method of claim 21, including receiving the worksite architectural and utility data and using the vehicle headlamp assembly to project an approximate depth of the underground items.

\* \* \* \* \*